United States Patent
Zhang et al.

(10) Patent No.: US 9,772,840 B2
(45) Date of Patent: *Sep. 26, 2017

(54) CLOUD-BASED LOCALIZATION PLATFORM

(71) Applicant: MICROSOFT TECHNOLOGY LICENSING, LLC, Redmond, WA (US)

(72) Inventors: Lei Zhang, Sammamish, WA (US); Michael James Miles, Duvall, WA (US); Sheng Zhang, Redmond, WA (US); Doo Suk Yoon, Redmond, WA (US); Xu Yang, Sammamish, WA (US); Wei Zhang, Sammamish, WA (US)

(73) Assignee: Microsoft Technology, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,973

(22) Filed: Feb. 13, 2015

(65) Prior Publication Data

US 2015/0154019 A1    Jun. 4, 2015

Related U.S. Application Data

(63) Continuation of application No. 13/789,091, filed on Mar. 7, 2013, now Pat. No. 9,026,994.

(51) Int. Cl.
*G06F 9/44* (2006.01)
*G06Q 10/06* (2012.01)
(Continued)

(52) U.S. Cl.
CPC .................. *G06F 8/70* (2013.01); *G06F 8/65* (2013.01); *G06F 9/4448* (2013.01);
(Continued)

(58) Field of Classification Search
CPC . G06F 8/70; G06F 8/65; G06F 9/4448; G06F 17/30876; G06Q 10/06; G06Q 10/10; H04L 67/10
See application file for complete search history.

(56) References Cited

U.S. PATENT DOCUMENTS 5,664,206 A * 9/1997 Murow ................. G06F 9/4448
704/5
6,490,547 B1 12/2002 Atkin et al.
(Continued)

OTHER PUBLICATIONS

Rosann Webb Collins, "Software Localization for Internet Software: Issues and Methods", [Online], IEEE2002, pp. 74-80, [Retrieved from Internet on Jun. 21, 2017], <http://ieeexplore.ieee.org/stamp/stamp.jsp?arnumber=991367>.*

(Continued)

*Primary Examiner* — Ziaul A Chowdhury
(74) *Attorney, Agent, or Firm* — Shook, Hardy & Bacon, LLP

(57) ABSTRACT

Systems, methods, and computer-readable media having computer-executable instructions embodied thereon that generate notifications that are delivered to translators who provide updates or translations that are included in localization resources for software applications are provided. Resources are stored on a computing device in a first database or a second database. The first database is configured to store software and has a first buffer that stores content selected for updating or translation and a second buffer for receiving updated content or translated content. The second database is configured to receive the content stored in the first buffer of the first database and to store profiles associated with translators. The second database provides a portal to authenticate the translator before allowing a translator to enter translations for the content stored in
(Continued)

the second database. A notification component notifies translators of content that matches a language of the translators.

14 Claims, 5 Drawing Sheets

(51) Int. Cl.
G06F 9/445 (2006.01)
G06F 17/30 (2006.01)
H04L 29/08 (2006.01)
G06Q 10/10 (2012.01)

(52) U.S. Cl.
CPC ....... *G06F 17/30876* (2013.01); *G06Q 10/06* (2013.01); *G06Q 10/10* (2013.01); *H04L 67/10* (2013.01)

(56) References Cited

U.S. PATENT DOCUMENTS

| | | | |
|---|---|---|---|
| 6,687,736 | B1 | 2/2004 | Lee |
| 7,571,092 | B1* | 8/2009 | Nieh ............... G06F 9/4448 704/1 |
| 7,584,467 | B2* | 9/2009 | Wickham ............. G06F 8/65 717/171 |
| 7,636,656 | B1 | 12/2009 | Nieh |
| 7,765,281 | B1 | 7/2010 | Crow et al. |
| 8,225,281 | B1* | 7/2012 | Hardinger ........... G06F 8/70 717/120 |
| 8,346,585 | B1* | 1/2013 | Griffith ........... G06Q 30/0623 705/7.11 |
| 8,640,093 | B1 | 1/2014 | Gill et al. |
| 2002/0111787 | A1* | 8/2002 | Knyphausen ....... G06Q 10/10 704/2 |
| 2004/0068721 | A1* | 4/2004 | O'Neill ............... G06F 8/65 717/168 |
| 2004/0249919 | A1* | 12/2004 | Mattheis ............. G06F 8/65 709/223 |
| 2005/0033718 | A1* | 2/2005 | Rettig ............... G06F 9/4448 |
| 2005/0050526 | A1 | 3/2005 | Dahne-Steuber |
| 2005/0066316 | A1 | 3/2005 | Nguyen |
| 2005/0097526 | A1 | 5/2005 | Hauduc et al. |
| 2005/0132348 | A1* | 6/2005 | Meulemans ......... G06F 8/65 717/168 |
| 2006/0046712 | A1 | 3/2006 | Shamp et al. |
| 2006/0287844 | A1 | 12/2006 | Rich |
| 2008/0127045 | A1 | 5/2008 | Pratt et al. |
| 2008/0127091 | A1 | 5/2008 | Ericsson et al. |
| 2008/0201703 | A1* | 8/2008 | Lerum ............... G06F 8/60 717/172 |
| 2008/0301670 | A1* | 12/2008 | Gouge ............ G06F 17/30867 717/173 |
| 2009/0037830 | A1 | 2/2009 | Kulkarni et al. |
| 2009/0094609 | A1* | 4/2009 | Burukhin ............. G06F 9/4448 718/104 |
| 2009/0193079 | A1 | 7/2009 | Gupta et al. |
| 2009/0222787 | A1* | 9/2009 | Aldahleh ........... G06F 9/4448 717/101 |
| 2010/0011354 | A1 | 1/2010 | Gharabally et al. |
| 2010/0199037 | A1 | 8/2010 | Umbehocker et al. |
| 2011/0066469 | A1 | 3/2011 | Kadosh |
| 2011/0276939 | A1* | 11/2011 | Frankin ............ G06F 8/71 717/101 |
| 2011/0289424 | A1 | 11/2011 | Rovik et al. |
| 2012/0054712 | A1 | 3/2012 | Melvin, Jr. et al. |
| 2012/0185235 | A1* | 7/2012 | Albat ............ G06Q 10/063118 704/2 |
| 2012/0240039 | A1* | 9/2012 | Walker ............. G06Q 10/10 715/265 |
| 2012/0245984 | A1 | 9/2012 | Lee |
| 2012/0290284 | A1 | 11/2012 | Aryattawanich et al. |
| 2012/0330985 | A1* | 12/2012 | Borzello ........... G06F 17/30619 707/756 |
| 2013/0124185 | A1* | 5/2013 | Sarr ................... G06F 17/289 704/2 |
| 2013/0226555 | A1* | 8/2013 | Lerum ............. G06F 9/4448 704/2 |
| 2013/0227522 | A1 | 8/2013 | Lerum et al. |
| 2013/0311611 | A1* | 11/2013 | Shim ................. H04L 67/10 709/217 |
| 2013/0325870 | A1 | 12/2013 | Rouse et al. |
| 2014/0129209 | A1* | 5/2014 | Saleme ............. G06F 9/4448 704/8 |
| 2014/0136180 | A1 | 5/2014 | Little |
| 2014/0280704 | A1* | 9/2014 | Ongg ................. H04L 67/10 709/217 |
| 2016/0335497 | A1* | 11/2016 | Williams .......... G06F 17/30256 |

OTHER PUBLICATIONS

Dianne Cyr et al., "Emerging Challenges in the Software Localization Industry", [Online], 2003,pp. 1-31, [Retrieved from Internet on Jun. 21, 2017], <http://www.diannecyr.com/docs/emerging_challenges.pdf>.*
David Lewis et al., "Web Service Integration for Next Generation Localisation", [Online], ACM 2009, pp. 1-9, [Retrieved from Internet on Jun. 21, 2017], <Web Service Integration for Next Generation Localisation >.*
Gio Wiederhold et al., "The Value of Outsourced Software", [Online], 2007, pp. 1-11, [Retrieved from Internet on Jun. 21, 2017], <https://appserv.pace.edu/seidenberg/sites/pace.edu.seidenberg/files/media/files/ssrn/TheValueOfOutsourcedSoftware4.pdf>.*
"Globalization Step-by-Step", Retrieved on: Feb. 6, 2013, Available at http://msdn.microsoft.com/en-us/goglobal/bb688141.
"Lingobit: Localization on Demand", Retrieved on: Mar. 14, 2013, Available at: http://www.lingobit.com/products/index.html.
"Walkthrough: Using Resources for Localization with asp.net", Retrieved on: Mar. 8, 2013, Available at: http://msdn.microsoft.com/en-us/library/fw69ke6f(v=vs.80).aspx.
Bray, Greg, "Localization and Globalization in WP7 Applications Using Resource Files", Published on: Sep. 19, 2010, Available at: http://codeblog.theg2.net/2010/09/localization-and-globalization-in-wp7.html.
Gross, Steffen, "Internationalization and Localization of Software", In PhD Thesis of Eastern Michigan University, Department of Computer Science, Jun. 19, 2006, 71 pages.
Mateos, Jaime, "A Web Services Approach to Software Localisation. Bringing Software Localisation Tools from the Desktop to the Cloud", A Dissertation Submitted to the University of Dublin, In Partial Fulfillment of the Requirements for the Degree of Master of Science in Computer Science, Available at: http://www.cs.fcd.ie/publications/tech-reports/reports.10/TCD-CS-2010-25.pdf, Retrieved on: Feb. 6, 2013, 110 pages.
O'Gara, Maureen, "Localization Goes Cloud", Published on: Sep. 6, 2011, Available at: http://cloudcomputing.sys-con.com/node/1967186.
Shu, Bei, "Two Modes of Implementing an XML-Based Localization Pack: Embed and Extend", Published on: Jun. 18, 2003, Available at: http://www.ibm.com/developerworks/xml/library/x-multlang/.
White, John, "Localization Project Management Log", Published on: Apr. 29, 2010, Available at: http://ventajamarketing.com/110nblog/2010/04/salesforce-com-localization-a-work-in-progress/.
Huan Liu et al., "GridBatch: Cloud Computing for Large-Scale Data-Intensive Batch Applications", [Online], IEEE 2008, pp. 295-305, [Retrieved from Internet on Dec. 26, 2014], http://ieeexplore.ieee.org/stamp/stamp.jsp?tp=&arnumber=4534231.
Ge Cheng et al., "Sealed Storage for Trusted Cloud Computing", [Online], IEEE 2010, pp. 335-339, [Retrieved from Internet on Dec. 26, 2014], http://ieeexplore.ieee.org/stamp/stamp.jsp?tp=&arnumber=5541060.
Claus Pahl, "Cloud Service Localisation", [Online], 2012, pp. 1-15, [Retrieved from Internet on Dec. 26, 2014], http://doras.dcu.ie/17083/1 /esocc12.pdf.
Dominic Jones et al., "A Semantic Model for Integrated Content Management, Localisation and Language Technology X Process-

(56) References Cited

OTHER PUBLICATIONS ing", [Online], 2011, pp. 1-91, [Retrieved from Internet on Dec. 26, 2014], http://ceur-ws.org/Vol-775/775-complete.pdf#page=43.
Non-Final Office Action dated Jul. 1, 2014 in U.S. Appl. No. 13/789,091, 22 pages.
Notice of Allowance dated Jan. 14, 2015 in U.S. Appl. No. 13/789,091, 13 pages.
"Non-Final Office Action Issued in U.S. Appl. No. 14/621,958", Mailed Date: Feb. 9, 2016, 23 Pages.
"Final Office Action Issued in U.S. Appl. No. 14/621,958", Mailed Date: Jul. 18, 2016, 20 Pages.

* cited by examiner

CLOUD-BASED LOCALIZATION PLATFORM

PRIORITY

This application claims priority and is a continuation of application Ser. No. 13/789,091, filed 7 Mar. 2013, and is related to co-pending application Ser. No. 14/621,958, which are incorporated herein by reference in the entirety.

BACKGROUND

Conventionally, software is localized in accordance with various languages or dialects. Users speaking any of the selected languages for localization may interact with localized versions of the software. Strings located in software files may be localized by manual or automatic translation. Strings embedded in software code may be extracted, localized, and then reinserted into the software code. For each localized version of the software, a separate string file is created.

Accordingly, the software may have one string file per localization and at least one file corresponding to default localization. A client device that executes the software may select a localization string file that matches the device's current location. A client device located in China may select the localized string resource having the appropriate Pinyin characters for the strings. A client device in England, however, may select the localized English characters for the strings. When the localized string file is unavailable for the device's current locale, the client device may select the default string file.

To reach a broad base of customers, localization files include other resources beyond strings. The localization files may include audio files, numbers, currency, and graphics that are translated to appropriately reflect the customs and norms of the locales where the software is executed. The client device may be loaded with multiple sets of localization files, each customized for a different device configuration. When a customer runs the software, the client device may select and load the localization file that best match the device.

Localization of software may be time-consuming and expensive when the number of languages used is large. Several middle processes (e.g. file reformat, file transfer, e-mail communications) are included in the conventional localization procedures. The localization costs comprise the time and money used to translate the content, create the localization file, and verify the correctness of the localization file. The costs may also include translation delays that impact release or shipment of the software. Accordingly, verifying localization files for the software may increase costs for the customers that execute the software.

SUMMARY

Embodiments of the invention relate to systems, methods, and computer-readable media for, among other things, performing a quick translation fix for content associated with software executed by a client device. The system may include a first database, a second database, and a notification component. The first database is configured to store software for one or more applications. The first database has two buffers: a first buffer and a second buffer. The first buffer stores content selected for updating or translation. The second buffer receives updated content or translated content. The second database is configured to receive the content stored in the first buffer of the first database. Also, the second database stores profiles associated with translators. The notification component is configured to notify one or more translators of content stored in the second database that matches a language stored in the profile corresponding to the one or more translators.

A computing network may store several software applications and corresponding development files that are scheduled for localization in several geographic regions. The computing network may include a second database that accesses the content associated with the development files. The content accessible by the second database may be limited to content that is selected for updating or translation. In turn, the second database may obtain the accessible content from the computing network. Additionally, the second database is configured to select one or more translators that may provide modified content or translated content. In one embodiment, the content is obtained from a first buffer storing portions of the development files.

One or more translator that provides updates for content is the software applications are identified. The translator may receive a notification from the second database when a profile for the translator indicates that one of the translated languages matches the language of the content. The notification informs the one or more identified translators that updates to the content are requested. Upon receiving a response from the one or more identified translators, the computing network provides the content to the responsive translators. In turn, modified content may be received from the one or more responsive translators.

Or, in some embodiments of the invention, the translator may receive a notification from the public database when a profile for the translator matches one or more languages of a geographic region corresponding to the language of the content. In response to the notification, a translator may log in to the cloud network to access the content. After the translator is authenticated at a portal to the cloud network, the public database may be accessed to obtain the content. The translator may provide modified or translated content for storage in the public database. In one embodiment, the public database may transmit the modified or translated content to a second buffer that stores modified or translated content. The buffer prevents a translator from directly modifying development files. After the modified content is reviewed by a quality specialist, the development files may be updated based on the modified or translated content included in the second buffer, in certain embodiments of the invention.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the invention are described in detail below with reference to the attached drawing figures, wherein.

DETAILED DESCRIPTION

Figure 1:
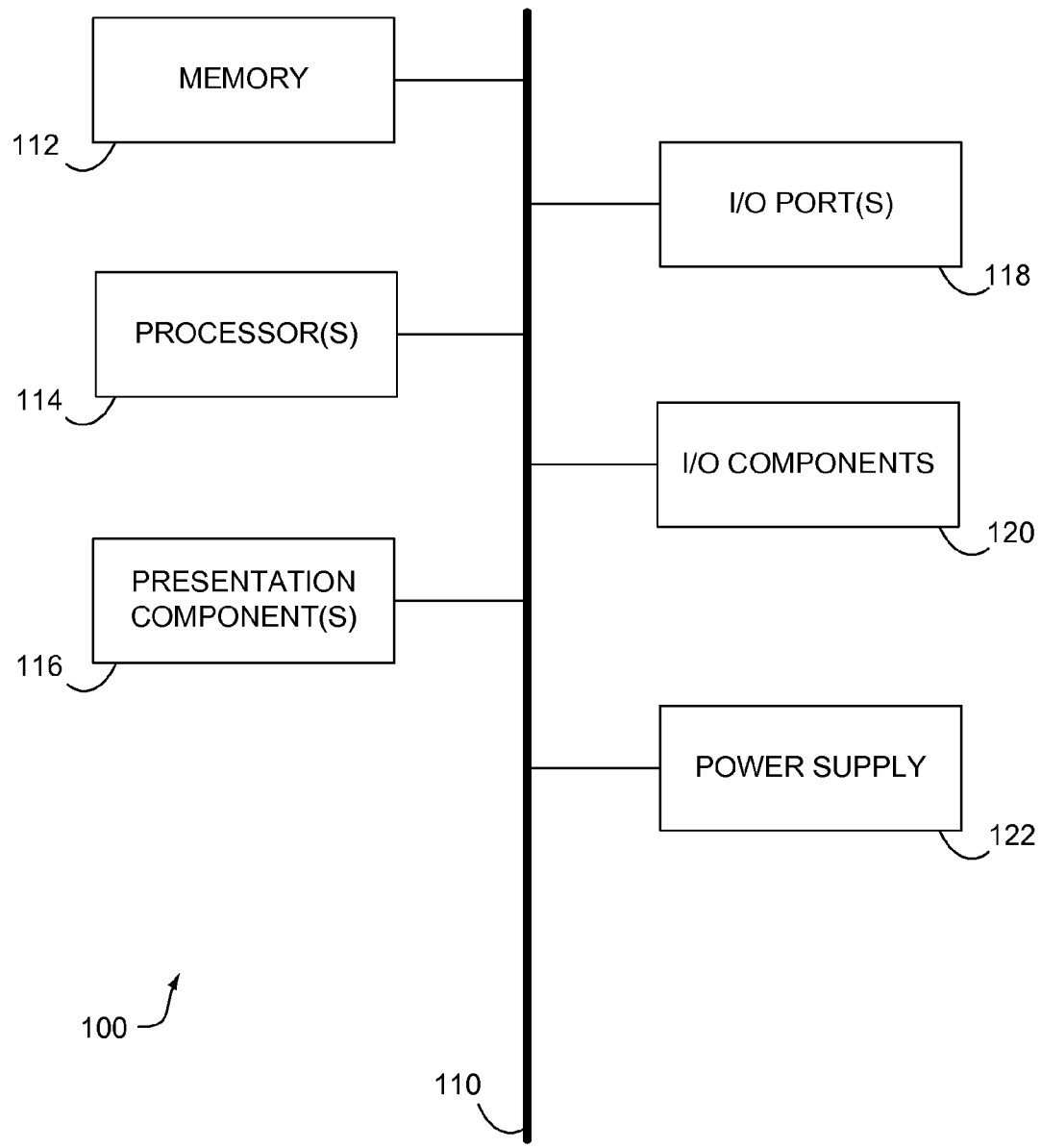
FIG. 1 is a block diagram illustrating an exemplary computing environment in accordance with embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," or "component," etc., might be used herein to connote different components of methods or systems employed, the terms should not be interpreted as implying any particular order among or between various steps herein disclosed unless and except when the order of individual steps is explicitly described.

Embodiments of the invention are directed to, among other things, a cloud localization platform that requests and obtains translation updates or modifications for software, services, or other content (e.g., audio, images, advertisements). In one embodiment, the translations and updates are stored on a cloud network. A translator may access a portal and provide translation or updates, which are stored in a database before applying the modifications to development files that correspond to the software. The cloud-based localization platform implements methods for presenting content, including strings of software development files or other content (e.g., advertisements) that require localization. The translator may directly access the content via the cloud network and provide the appropriate translation or updates. In some embodiments, the translator is selected based on information stored in a profile. Each translator may register with the cloud-based localization and may provide contact information and language competency for storage in the profile. The cloud localization platform may create and maintain the profile information of the translator (e.g., localization companies and individual localizers). The profiles may be accessed to record and track performance metrics for each of the translators.

The cloud-based platform allows quick updates for translation errors that may have geopolitical consequences. In some embodiments, the content (e.g., strings, images, or audio) may be extracted from the completed version of an application that does not ship. Testers may test the updated content or translated content received from a translator before including the updated content or translated content in development files stored in the cloud network.

Accordingly, a cloud localization platform provides translators with a uniform and central user interface for accessing content that requires updating or translating. The web-based interface may obviate the need for a translator to install specialized editing software for providing the updates or translation for the software content. Additionally, the cloud-based localization platform promotes the localization enables both file and string translation. The translator accessing the cloud localization platform may modify either an individual string or a file having strings, images, or other content based on the need of the software application. The cloud localization platform provides the ability to perform translations of small amounts of content associated with the software files. Therefore, the cloud localization platform also enables a software developer to obtain small corrections without exposing all file contents to the translators.

In other embodiments, third-party software developers may upload application content to the cloud-based localization platform. The third-party software developers may specify languages and portions of the application content that require updating or translation. Upon receiving the software application content on the cloud network, the translators may be informed (by the localization platform) that portions of a software file need updating or translation in one or more languages.

As used herein, language refers to an oral communication, dialect, or writing system that is common to individuals within the same community, geographical region, and/or culture. By way of example only, types of languages include Chinese, English, German, Indian, Italian, Japanese, Spanish, forms thereof, and the like.

A computer system (e.g., e-book, tablet, or handheld device) may provide one or more translators access to a cloud localization platform. The computer system is configured to receive notification messages when updates or translation of localization resources for one or more software applications is requested. The localization resources may represent various languages like Bosnian, Bangla, Chichewa, English, French, tribal languages, Tonga, etc. A cloud server may identify one or more translators that can provide updates or translations in one or more languages corresponding to the software application or service and the requested localization resources. The identified translators may receive a notification message requesting translation or update of content associated with the software application.

FIG. 1 is a block diagram illustrating an exemplary computing environment in accordance with embodiments of the invention. Having briefly described an overview of the embodiments of the invention, an exemplary operating environment in which various components may be implemented is described below. Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Nor should the computing device 100 be interpreted as having any dependency or requirement relating to any one or combination of components illustrated.

The embodiments of the invention may be described in the general context of computer code or machine-useable instructions, including computer-executable instructions such as program components being executed by a computer or other machine, such as a personal data assistant or other handheld device. Generally, program components including routines, programs, applications objects, components, data structures, and the like, refer to code that performs particular tasks or implements particular abstract data types. Embodiments of the invention may be practiced in a variety of system configurations, including handheld devices, tablet computers, consumer electronics, general-purpose computers, specialty computing devices, etc. Embodiments of the invention may also be practiced in distributed computing environments where tasks are performed by remote-processing devices that are linked through a communications network.

As one skilled in the art will appreciate, the computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application specific integrated circuit (ASIC), system-on-a-chip (SOC), or complex programmable logic devices (CPLDs). The hardware logic allows a cloud server to provide the localization resources to the client device. The cloud server may be configured to identify localization resources for one or more applications that require modification or translation. The cloud server may, in an embodiment, provide a notification requesting corrections to the localization resources from translators having profiles that include a language of interest to the software developer or a language corresponding to a software application. The corrections provided by a selected translator may include removing content, adding content, blurring content, or changing colors of the content associated with the software application. The cloud server, in some embodiments, includes a distributed computer system for processing the requests for localization files.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired data and that can be accessed by the computing device 100. In an embodiment, the computer storage media can be selected from tangible computer storage media like flash memory. These memory technologies can store data momentarily, temporarily, or permanently.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components include a microphone, joystick, game pad, satellite dish, scanner, printer, wireless device, a controller, such as a stylus, a keyboard, or a mouse, or a natural user interface (NUI), etc.

The NUI processes air gestures, voice, or other physiological inputs generated by a user (e.g. translator, software developer, third-party developer). These inputs may be interpreted as, among other things, translation requests, requests for updating content for a software application, or requests for interacting with a web page displayed by the computing device 100 and associated with the cloud server. These requests may be transmitted to the appropriate network element for further processing. The NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Various aspects of the technology described herein are generally employed in computer systems, computer-implemented methods, and computer-readable storage media for, among other things, correcting and updating localization resources. In one embodiment, a cloud server may store applications and localization resources that correspond to specific regions of the globe. The localization resources correspond to, among other things, a language (e.g., Japanese, Chinese, English, Spanish, Indian). By way of example only, an application might have localization resources in twenty languages.

The localization resources allow an application or service to provide a culturally relevant adaption of the application for a specific region of the globe. As such, application features, such as the user interface, settings, metadata, text, images, audio, and/or the like, are translated to correspond with the language and/or culture of the geographic region for the application. By way of example only, the English version of an e-book application or news application may be adapted or converted to a Japanese version of Windows® so that it can be utilized in Japan.

Such localized applications might be analyzed to verify that the localization resources (which may be stored on a cloud server) appropriately incorporate the language desired, intended, or expected to be viewed by user of client device in a specific geographic region. By way of example only, an application and corresponding localization resources may be developed and distributed in China. In such a case, the localized resources may include varying forms of Pinyin characters, images, or audio having dialects that correspond with the local geographic region. The localization resources enable individuals that communicate using Chinese to interact with the application. The application, or a portion thereof, might not be properly, accurately, or completely translated into a desired language based on the error or incomplete localization resources. After verifying that localization resources are inaccurate, the cloud server may request updated localization resources with corrections from translators of the specific geographic region that corresponds the requested corrections and in the desired language or dialect corresponding to localization resources.

In one embodiment, a computer system may include a cloud server that is accessible by a client device. The cloud server stores applications and localization resources. The cloud server may execute a localization platform. The client devices may access the localization platform to provide updates or translations corresponding localization resources. In some embodiments, the translators' client devices may receive notifications from the cloud server. The notifications may indicate that translation or updates for an application in a translated language are requested. The translators may access the localization platform via the client devices.

Figure 2:
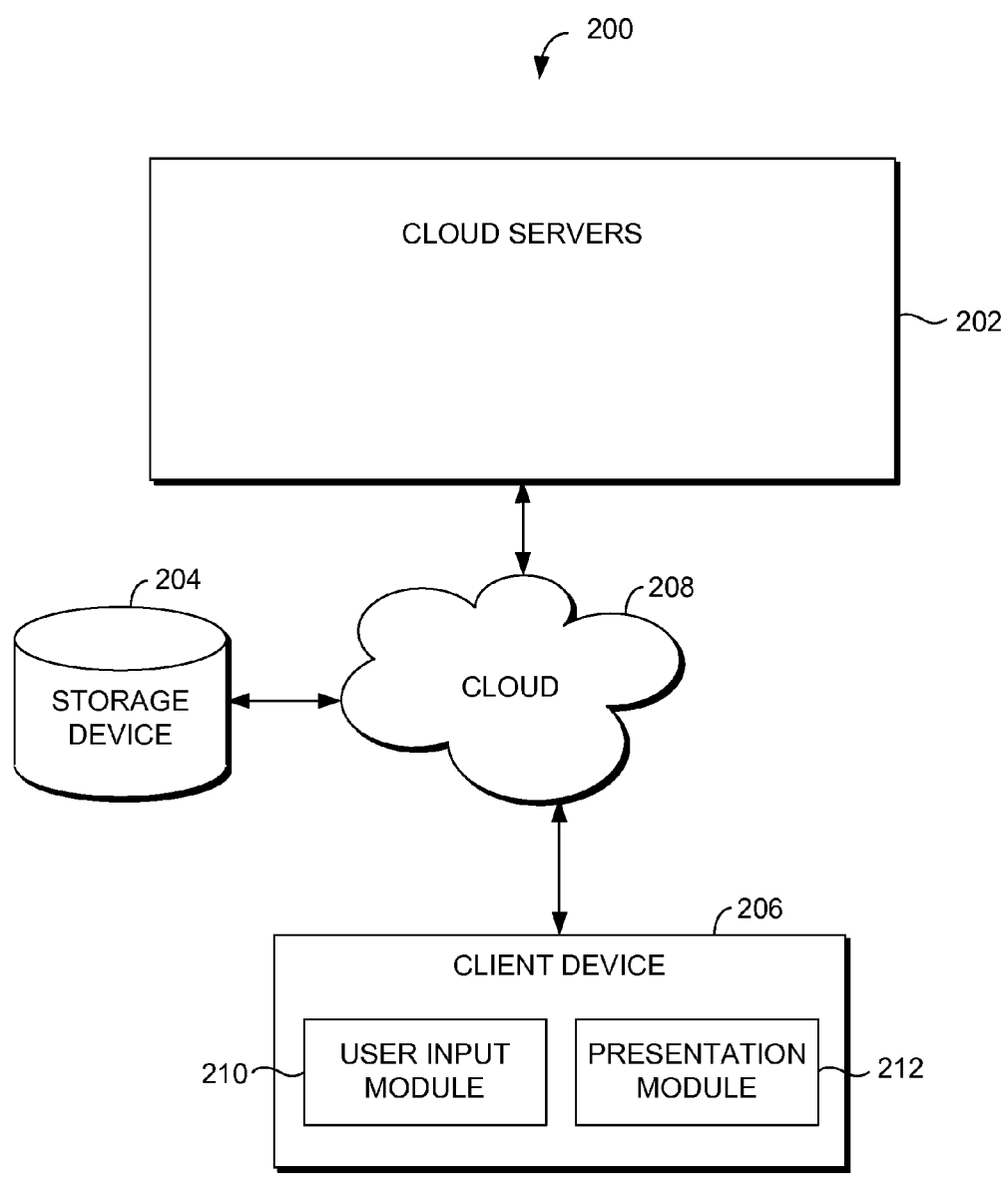
FIG. 2 is a block diagram illustrating an exemplary computing system architecture in accordance with embodiments of the invention.

FIG. 2 is a block diagram illustrating exemplary computing system architecture 200 in accordance with embodiments of the invention. The computing system architecture 200 includes, among other things, cloud servers 202, storage devices 204, client device 206, and cloud network 208. It is understood and appreciated by those of ordinary skill in the art that the computing system architecture 200 shown in FIG. 2 is merely an example of one suitable computing system and is not intended to suggest any limitation as to the scope of use or functionality of the embodiments of the invention. Neither should the computing system architecture 200 be interpreted as having any dependency or requirement related to any single module/component or combination of modules/components illustrated therein.

The cloud servers 202, storage device 204, and client device 206 are connected to each other and in communication with one another via a cloud network 208. The cloud network 208 may include, without limitation, one or more local area networks (LANs) and/or wide area networks (WANs). Such networking environments are commonplace in offices, enterprise-wide computer networks, intranets and the Internet. The cloud network 208 may be provided or maintained by Microsoft, Amazon, Apple, or any other cloud provider. Accordingly, the cloud network 208 is not further described herein.

Each of the cloud servers 202 and the client device 206 shown in FIG. 2 may be any type of computing device, such as, for example, computing device 100 described above with reference to FIG. 1. By way of example only and not limitation, each of the server 202 and the client device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The cloud servers 202 may include any type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server 2005, which was developed by the Microsoft Corporation headquartered in Redmond, Wash.

Components of the cloud servers 202 (not shown for clarity) may include, without limitation, a processing unit, internal system memory, and a suitable system bus for coupling various system components, including one or more databases for storing information (e.g., files and metadata associated therewith). Each cloud server 202 typically includes, or has access to, a variety of computer-readable media. By way of example, and not limitation, computer-readable media may include computer-storage media and communication media. In general, communication media enables each server to exchange data via a network, e.g., network 208. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the cloud server 202 is illustrated as a single unit, one skilled in the art will appreciate that the cloud servers 202 is scalable. For example, the server 202 may in actuality include a plurality of servers in communication with one another. Moreover, the storage device 204 may be included within the cloud servers 202 or client device 206 as a computer-storage medium. The single unit depictions are meant for clarity, not to limit the scope of embodiments in any form.

The cloud server 202 executes localization platforms that allow software applications or content associated with localization resources to be updated or translated via the cloud network 208. The cloud servers 202 may receive requests to update or translate content of localization resources. The requests, in some embodiments, are provided by software developers.

In one embodiment, the cloud servers 202 automatically identify translators for updating or translating localization resources into a selected number of languages. The cloud servers 202 may generate notification messages and transmit the messages to translators that translate languages selected by the software developers or corresponding to the content of the software application. The localization resources and updates or translations may be buffered before storage in appropriate folders on the cloud servers 202. The buffered content may be moved into the folders after a tester confirms that updates or translations are appropriate. Inappropriate updates or translations are ignored or discarded. In one embodiment, the folders may specify the application and language associated with the localization resources.

The storage device 204 is configured to store, among other things, applications or localization resource files. The storage device 204 is accessible by the cloud servers 202. In various embodiments, localization resource files may include, without limitation, text, images, audios, information associated therewith, and the like, in association with various languages. In an embodiment, the storage device 204 is configured to be searchable for one or more of the items stored in association therewith. In other embodiments, storage device 204 may store a public database that provides access to, among other things, translator profile information. It will be understood and appreciated by those of ordinary skill in the art that the information stored in association with the storage device 204 may be configurable and may include any information relevant to one or more applications. The content and volume of such information are not intended to limit the scope of embodiments of the invention. Further, though illustrated as a single, independent component, the storage device 204 may, in fact, be a plurality of storage devices, for instance a database cluster, portions of which may reside on the server 202, the client device 206, another external computing device (not shown), and/or any combination thereof.

As shown in FIG. 2, the client device 206 includes a user input module 210 and a presentation module 212. The client device 206 executes one or more applications, including a web browser that is configured to access the cloud servers 202. The one or more applications are interacted with via the user-input module 210 and application content is rendered via the presentation module 212. In one embodiment, a translator may, via a portal to the cloud servers 202, provide updates or translations for localization resources identified by the cloud servers 202. The updates or translations for the application may alter the text, images, audio, or graphics rendered by the presentation module 212. The updates may include changes in languages, colors, or other culturally relevant indicators.

In some embodiments, one or both of the modules 210 and 212 may be implemented as stand-alone applications. These stand-alone applications may be downloaded from the cloud server 202. In other embodiments, one or both of the modules 210 and 212 may be integrated directly into the operating system of the client device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof.

The user input module 210 is configured for receiving input. Typically, input is received via a user interface (not shown) associated with the client device 206 or the like. Upon receiving input, the presentation module 212 of the client device 206 is configured for presenting results appropriately localized based on localization resources. Embodiments are not intended to be limited to visual display but rather may also include audio presentation, combined audio/video presentation, and the like.

Accordingly, a cloud server provides access to localization resources via the cloud network to client devices of one or more translators. The cloud server is communicatively connected to a storage device that stores applications and one or more corresponding localization resources. The localization resources include, among other things, string files for several languages. A translator may access the localization resources via the cloud server to provide updates or translations via the portal presented on the client device. In some embodiments, the localization resources may not be stored permanently on the client device. In turn, updates or translations for localization resources are made without updating the application itself. The updating or translation of content corresponding to the localization resource may update string, audio, images, etc. associated with an application or advertisements provided to an application.

In some embodiments, a localization platform requests translations or modifications of content associated with software development files. The localization platform is a cloud-based platform that is accessible to a client device via a cloud network. Translators, including individual localizers and localization service companies, may be selected to provide updates or translations for content corresponding to the software development files. The translations or updates for the content corresponding to software development files are buffered at the localization platform. After confirming that the translation or updates are accurate (e.g., nonmalicious), the software development files may incorporate the translation or updates in one or more localization files. In an embodiment, the software development profiles may be uploaded to a localization platform by third-party developers that request language translation or language updates to content included in the software development files.

Figure 3:
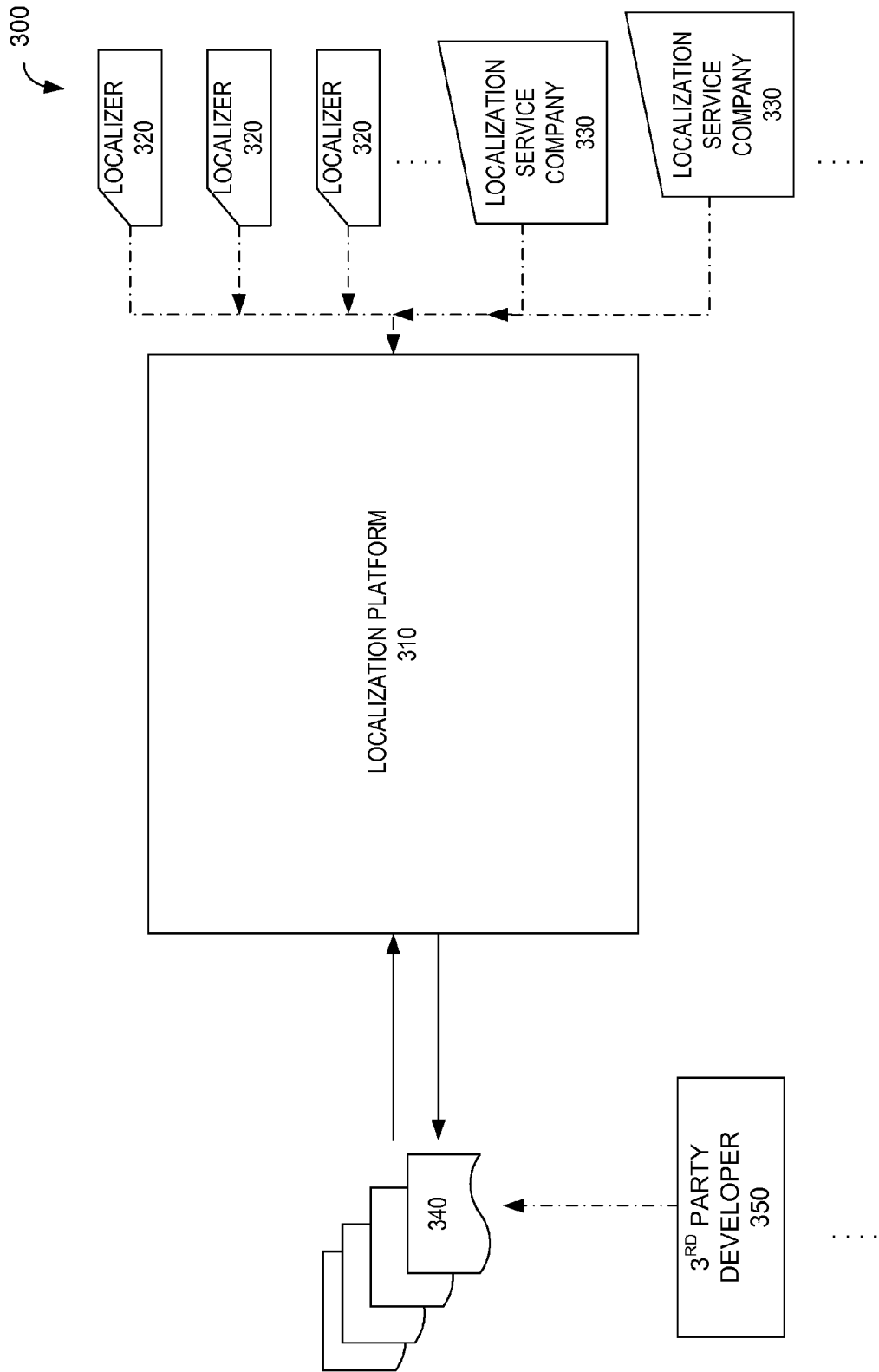
FIG. 3 is a component diagram illustrating an exemplary cloud localization system in accordance with embodiments of the invention.

FIG. 3 is a component diagram illustrating an exemplary cloud localization system 300 in accordance with embodiments of the invention. The cloud localization system 300 includes a localization platform 310, localizers 320, localization service companies 330, software development files 340, and third-party developers 350.

The localization platform 310 allows application developers (e.g., third-party developers 350) to obtain updates or translations for content included in the software development files 340. The updates may correct strings or other content included in the software development files 340. The localization platform provides a portal accessible by the localizers 320 and localization service companies 330. The localization platform 310 may require a translator selected from the group of translators comprising the localizers 320 and localization service companies 330. In one embodiment, the localization platform 310 may store translator profiles for the localizers 320 and localization service companies 330. A translator may be selected based on, among other things, a combination of prior translation success by the translator, prior translation failures by the translator, or matches between the language of the content update or content translation requested by the software developer and the language included in the profiles for the localizers 320 and localization service companies 330.

The localizers 320, in some embodiments, are individuals that translate content into one or more languages. The localizers 320 may register with the localization platform 310 to obtain notifications for when language updates or translations for content is requested for one or more development files. The localizers 320 may create a translator profile that stores contact information for the individual translator. In other embodiments, the profiles may include metrics that measure the performance of the translator. The metrics may include turnaround time, error rate, response time, and number of languages that translator may provide content updates and translation for. The localization platform may select the translators based on the metrics associated with performance. The selected localizers 320 may authenticate at a portal of the localization platform 310 before providing updates and translations for content corresponding to the software development files 340.

The localization service companies 330, in some embodiments, are companies having several individuals that translate content into one or more languages. The localization service companies 330 may register with the localization platform 310 to obtain notifications for when language updates or translation of content is requested for one or more development files. The localization service companies 330 may create translator profiles that store contact information for the company. In other embodiments, the profiles may include metrics that measure the performance of the localization service companies 330. The metrics may include, among other things, aggregate or average turnaround time, aggregate or average error rates, aggregate or average response times, and aggregate or average number of languages that localization service companies 330 may provide content updates and translation for. The localization platform 310 may select the translators based on the metrics associated with performance. The selected localization service companies 330 may authenticate at a portal of the localization platform 310 before providing updates and translations for content corresponding to the software development files 340.

The software development files 340 correspond to applications. The software development files may include binary files or source files. In some embodiments, segments or portions of the software development files 340 are identified as they need updating or translation. The localization platform 310 may retrieve the identified segments and expose only these segments to a selected translator. In turn, the translator receives a notification that content associated with an application is selected for modification or translation. The translator may provide modified content or translated content to the localization platform 310, which may incorporate the modified content or the translated content into the software development files.

The third-party developers 350, in one embodiment, may provide software development files to the localization platform 310. The third-party developers include application coders that need assistance with localizing their applications in one or more regions. The third-party developers 350 may provide instructions that include the content that may need modification or translation. In turn, the localization platform 310 identifies translators that can provide the modifications or translations requested by the third-party developer 350.

Accordingly, translators that register with the localization platform may receive notifications when updates or translations for content corresponding to the software development files are requested. The translators may provide the updates or translations when the language corresponding to the file or included in the request is a translated language. Third-party developers may access the localization platform to obtain localization resources for one or more application that are developed by the third-party developers.

In some embodiments, the localization platform may include several databases and a notification system. The databases may be configured to store, among other things, the selected segments of the software development files, the modification or translation received from the translators, profiles for each of the translators, and notifications generated by the notification system. The notification system may transmit a message to inform one or more translators that modification of content in one more languages or translation from a first language to the second language is requested.

Figure 4:
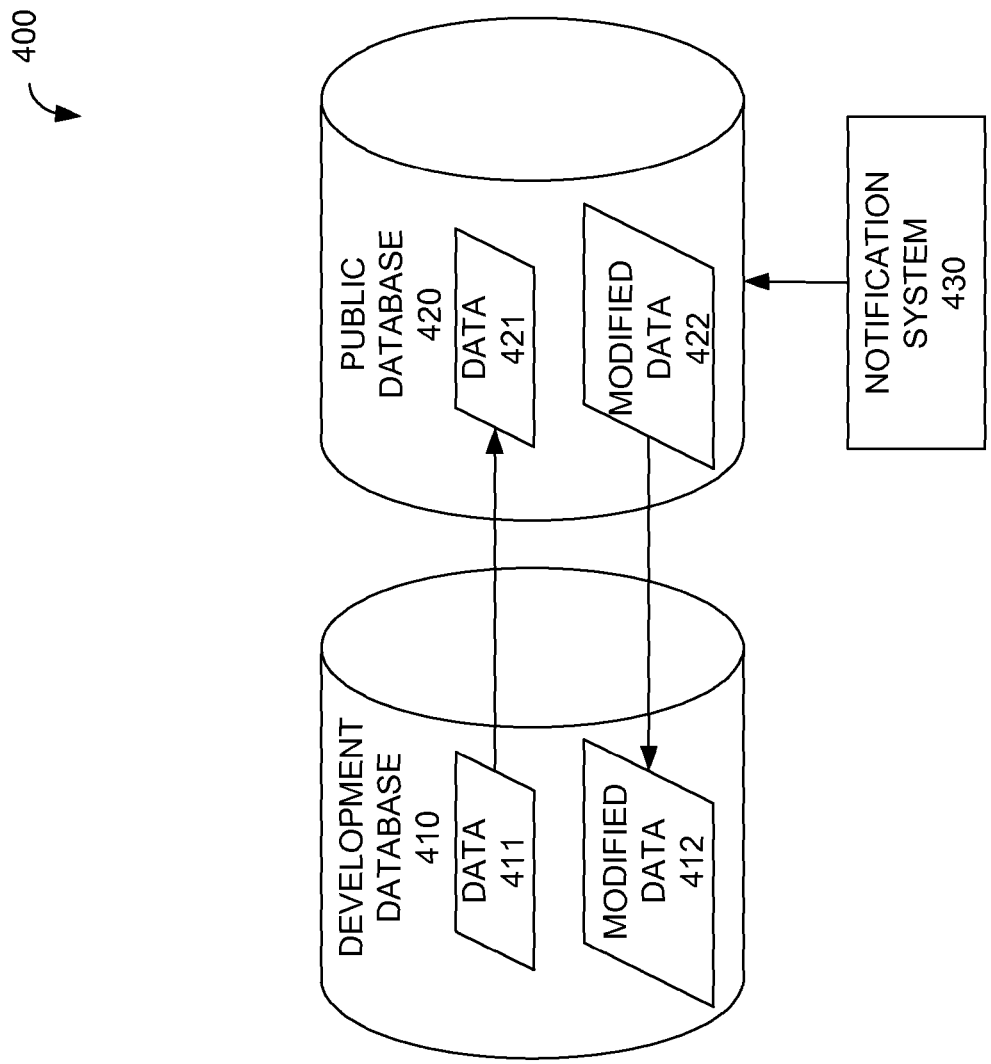
FIG. 4 is a component diagram illustrating databases and notification systems of the cloud localization system in accordance with embodiments of the invention.

FIG. 4 is a component diagram illustrating databases and notification systems of the cloud localization system 400 in accordance with embodiments of the invention. The cloud localization system 400 includes, among other things, development database 410, public database 420, and notification system 430. In some embodiments, the development database 410 and public database 420 may be one database. In other embodiments, the development database 410 and public database 420 may be distributed across several databases.

The development database 410 may store the content (e.g., strings) selected for translation or modification by the developers of the software development files. In one embodiment, the development database 410 may include a first buffer 411 and second buffer 412. The first buffer 411 stores the selected content and the second buffer stores the modified or translated content. The content included in the first buffer 411 is transmitted to the public database to allow translators to access the selected content. The content stored in the first buffer may expire periodically. In one embodiment, the first buffer 411 may periodically push its content to the public database 420.

The buffers 411 and 421 both store the selected content for translation and modification. The buffer 411 loads its content to buffer 421 of the public database 420. Similarly, buffers 422 and 412 both store the modified or translated content received from the translators. The buffer 422 loads its content to buffer 412 of the development database 410. The buffers 411, 412, 421, 422 may store the data momentarily because the contents of the buffers expire after a period of time. In some embodiments, the period of time is 2 hours, 4 hours, 1 day, a week, etc.

All content (e.g. strings) of the software development files that are selected for modification or translation are buffered and corresponding modification and translation of the content are buffered prior to incorporation into the software development files. Before incorporation into software development files, the modified or translated content is tested for error or malicious content.

The public database 420 is configured to store the content selected for modification or translation and profiles for the translators that have registered with the localization platform. The public database 420 also connects to a notification system 430 that triggers one or more notifications when new content is received at the public database 420 from the development database 410. The public database 420 provides a portal where registered translators responding to a notification may access the content selected for modification or translation. The public database 420 may update the translator profile to record when the translator accessed the database and when the translation was received from the translator. The translator profiles may track user efficiency and other performance criteria. A translator accessing the public database 420, in one embodiment, is only authorized to access the content associated with the language that the translator translates. The public database 420 may set translator permissions for the content. The permissions may be based on language, size of the content, number of translations pending, number of translations completed, average length of time for each translation, and other criteria associated with the translator.

The translators may access the public database 410 via a portal associated with the localization platform. The portal allows the translator to view and edit the content selected for translation and modification. Based on the permissions set by the translator, the content selected for modification or translation may be edited directly at the portal. The translator changes made on the portal are stored at the public database 420 in the buffer 422 as modified content or translated content. The modified data stored in buffer 422 will be loaded in the development database 410 at buffer 412. In some embodiments, the modified content is pushed to the development database 410 periodically (daily, hourly, etc.).

The notification system 430 is configured to transmit notification messages to translators selected for providing the modified content or the translated content. The notification system 430 may obtain, from the public database 420, contact information for the selected translators. In turn, the notification system 430 generates short message service (SMS) or electronic mail (e-mal) messages for the selected translators based on the contact information. The messages, in certain embodiments, may include a snippet of the content that is requested and an indication that a response is required within a specific period of time (e.g., 2 hours or 4 hours).

Accordingly, the cloud-based localization platform provides, among other things, a development database, a public database, and notification component. The development database stores software for one or more applications and is configured with at least two buffers (that are not accessible by the translators or the public). A first buffer of the development database stores content selected for updating or translation and the second buffer stores updated content or translated content received from a translator. The public database, unlike the development database is accessible by the public (e.g., translators). The public database receives the content stored in the first buffer of the development database and stores the content selected for modification or translation. The public database, like the development database, is configured with at least two buffers. The first buffer of the public database stores content selected for updating or translation that is accessible by the translator based on the permission set of the content. The second buffer of the public database stores updated content or translated content received from the translator. The public database, in one embodiment, also stores profiles associated with translators. The profiles may be used to select one or more translators that receive the content selected for modification or translation. The notification component notifies one or more selected translators of content stored in the public database that matches a language stored in the profile corresponding to the one or more translators.

A localization platform managing software localization is cloud based, in certain embodiments. The localization platform provides translations or modification for selected content associated with software development files. The localization platform identifies one or more translators that may provide the required modifications or translations for the software development files. The selected translators, in one embodiment, are notified via notification messages generated by the localization platform. The modification or translation is received from the translators and staged for incorporation into the development files.

Figure 5:
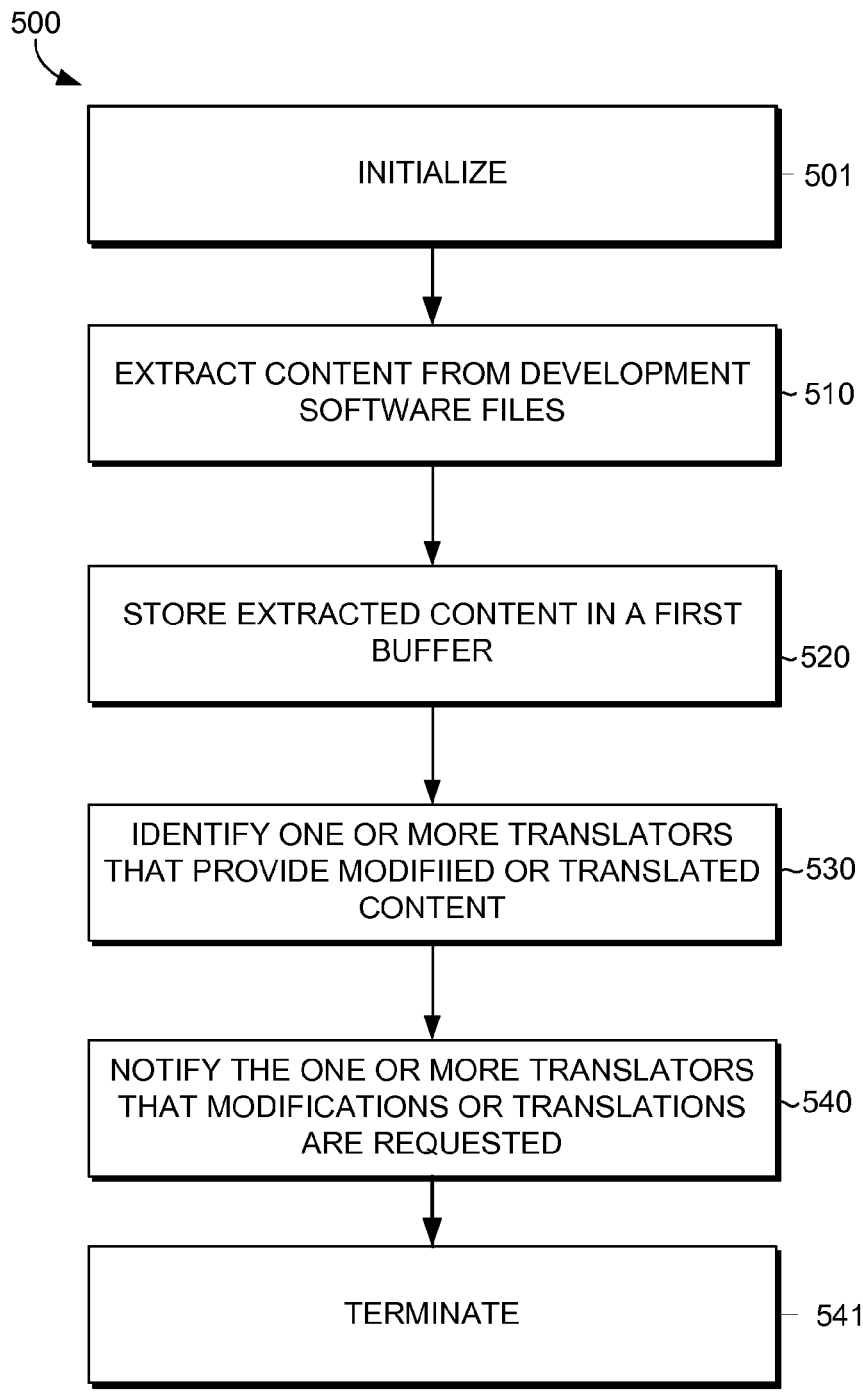
FIG. 5 is a logic diagram showing a method for providing cloud-based translation in accordance with embodiments of the invention.

FIG. 5 is a logic diagram 500 showing a method for providing cloud based translation in accordance with embodiments of the invention. The method initializes in step 501. In step 510, the localization platform may extract content from software development files. The software development files may correspond to any one of the following: binary files, source files, or localization resources. In an embodiment, the extracted content includes content identified as should be updated or should be translated.

The localization platform stores the identified content in a first buffer accessible by a database within a cloud network, in step 520. The first buffer may be accessed by a public database to obtain the identified content, in an embodiment. Additionally, the first buffer may be checked periodically by the public database for the identified content. The first buffer is checked daily, weekly, or monthly. The first buffer may also expire periodically (e.g., hourly daily, bi-weekly).

In turn, one or more translators that provide translations for a language associated with the content are identified by the localization platform, in step 530. The localization platform may access translator profiles. The profiles may store translator contact information. The translator contact information, in one embodiment, includes a SMS contact, an e-mail address, and a telephone number. The translator profile may also specify one or more languages that the translator translates.

In step 540, the one or more identified translators are notified with one or more notification messages generated by the localization platform. The notification messages are sent to one or more mobile devices or one or more computing devices corresponding to contact information identified in the translator profiles that match the one or more languages associated with the identified content. The localization platform, in certain embodiments, may identify one or more additional languages that correspond to one or more regions associated with the language of the content. These additional languages may be considered by the localization platform when selecting a translator that receives the notification messages. The one or more regions may include a geographic region, tribe, town, or city. The notification messages may indicate that translation services are requested.

The localization platform provides the identified content to the one or more identified translators that respond to the notification message. Then, one or more responsive translators may provide modified content or translated content to the localization platform for storage in the database. In some embodiments, the translator logs into a portal of the localization platform to provide the modification or translation. The portal is provided by the cloud network. The identified content may be modified or translated directly by the database storing the identified content on the cloud network, by a translator's mobile device that connects to the cloud network and stores a copy of the identified content, or by the translator's computing device that connects to the cloud network and stores a copy of the identified content. A second buffer of the database may store updates received from one or more responsive translators authorized to provide the modified content or the translated content.

In some embodiments, the software development file is updated with the modified content or the translated content after the second buffer of the database storing the modified content or the translated content is selected for loading into the software development file. The loading to the software development file, in one embodiment, may occur after the modified content or the translated content is verified as correct and non-malicious. The second buffer is configured to prevent the translator from directly making changes to the software development files. The method terminates in step 541.

In summary, a cloud localization platform is configured to provide content translation or modification for software development files. The localization platform includes a development database, a public database, and a notification system. The development database stores software for one or more applications. It also includes a first buffer that stores content selected for updating or translation and a second buffer for receiving updated content or translated content. The development database is further configured to receive, from one or more third-party application developers, software applications that require translation. The content that is selected for translation or updating is specified by the one or more third-party application developers and the one or more languages for the translation are selected by the one or more third-party application developers.

The public database receives content stored in the first buffer of the development database and stores profiles associated with translators. The content may include an advertisement for a geographic region associated with the translator. The public database may also provide a portal to authenticate a responsive translator before allowing the translator to enter modifications or translations for the content stored in the public database.

The notification component generates the notification messages that inform one or more translators of content stored in the public database. When the content matches a language stored in the profile corresponding to the one or more translators, the translators are selected to receive the notification. The notification message may be provided via an email message or SMS message to computing devices corresponding to the selected translators.

It will be understood by those of ordinary skill in the art that the order of steps explained above are not meant to limit the scope of the embodiments of invention in any way and, in fact, the steps may occur in a variety of different sequences within embodiments hereof. Any and all such variations, and any combination thereof, are contemplated to be within the scope of embodiments of the invention. Alternative embodiments will become apparent to those of ordinary skill in the art to which the embodiments of the invention pertains without departing from its scope.

From the foregoing, this innovation is one well adapted to attain all the ends and objects set forth above, together with other advantages that are obvious and inherent to the system and method. It should be understood that certain features and subcombinations are of utility and may be employed without reference to other features and subcombinations. This is contemplated by and is within the scope of the claims.

The technology claimed is:

1. A computer-implemented method for providing translation of software applications over a computer network, the method comprising:
   accessing profiles for one or more translators, wherein the profiles include one or more languages that the one or more translators translate;
   determining contact information for the one or more translators from the profiles;
   identifying one or more translators that provide translations for the software applications;
   communicating a notification to the one or more translators that content of the software applications has been identified for translation, wherein the notifications are sent to one or more mobile devices or one or more computing devices identified in the profiles of the one or more translators;
   providing, in a first buffer, the identified content to one or more responsive translators of the one or more translators that respond to the notification message;
   receiving modified content from the one or more responsive translators; and
   storing the modified content in a second buffer for verification, wherein the second buffer is isolated from a development database that includes one or more software development files corresponding to the software applications.

2. The computer-implemented method of claim 1, further comprising verifying that the modified content is correct and non-malicious.

3. The computer-implemented method of claim 2, wherein the one or more software development files correspond to localization resources for the software applications.

4. The computer-implemented method of claim 2, further comprising loading the modified content into the one or more software development files.

5. The computer-implemented method of claim 4, wherein the second buffer prevents changes from being made directly to the one or more software development files in the development database.

6. The computer-implemented method of claim 4, wherein the second buffer stores updates received from the one or more responsive translators.

7. The computer-implemented method of claim 1, wherein the first buffer accesses the development database to obtain the identified content.

8. The computer-implemented method of claim 1, wherein the first buffer accesses the development database periodically to obtain the identified content.

9. A computer network system for translating software, the system comprising:
   a central processing unit (CPU);
   a first database configured to store software for one or more applications and content selected for translation, wherein the content selected for translation is extracted from the software for the one or more applications;
   a second database accessible within the computer network and configured to receive the content selected for translation stored in the first database, to store the content selected for translation in a first buffer, and to store profiles associated with one or more translators; and
   a computer-readable storage medium comprising computer executable instructions embodied thereon, that when executed by the CPU:
      accesses the profiles for one or more translators, wherein the profiles include one or more languages that the one or more translators translate,
      determines contact information for the one or more translators from the profiles,
      communicates notifications to the one or more translators that the content selected for translation matches a language stored in the profiles corresponding to the one or more translators, wherein the notifications are sent to one or more mobile devices or one or more computing devices identified in the profiles of the one or more translators,
      provides the one or more translators with access to the content selected for translation,
      receives translated content from at least one of the one or more translators, and
      stores the translated content in a second buffer within the second database for verification, and
      upon receiving the verification, provides the translated content to a software development file for the one or more applications in the first database.

10. The computer network system of claim 9, wherein the software development file for the one or more applications is updated with the translated content after the second buffer storing the translated content is selected for loading into the software development file.

11. The computer network system of claim 9, wherein the contact information includes one or more of a SMS contact, an e-mail address, and a telephone number.

12. The computer network system of claim 9, the executed computer executable instructions further comprising: identifying one or more additional languages that correspond to one or more regions associated with the language of the content selected for translation.

13. The computer network system of claim 12, wherein the one or more regions include one or more of a geographic region, a tribe, a town, and a city.

14. The computer network system of claim 9, wherein the first database is further configured to receive, from one or more third-party application developers, the one or more applications and the content selected for translation, and wherein one or more languages for the content selected for translation are specified by the one or more third-party application developers.

* * * * *